United States Patent [19]

Goodacre et al.

[11] 3,848,759
[45] Nov. 19, 1974

[54] INDUSTRIAL LIFT TRUCKS

[75] Inventors: Cecil Goodacre; Peter Alfred Leggett, both of Basingstoke, England

[73] Assignee: Lansing Bagnall Limited, Basingstoke, England

[22] Filed: May 4, 1973

[21] Appl. No.: 357,384

[30] Foreign Application Priority Data
May 8, 1972  Great Britain.................. 21442/72

[52] U.S. Cl.................................. 214/730, 74/422
[51] Int. Cl.................................................. B66f 9/14
[58] Field of Search........... 74/29, 422; 214/16.4 A, 214/730, 731, 75 G, 75 R, 670, 671, 672, 214/673, 674

[56] References Cited
UNITED STATES PATENTS

| | | | |
|---|---|---|---|
| 2,780,112 | 2/1957 | Young | 74/422 |
| 2,788,905 | 4/1957 | Grove | 74/29 |
| 3,572,530 | 3/1971 | Ohntrup | 214/730 |

*Primary Examiner*—Robert J. Spar
*Assistant Examiner*—Lawrence J. Oresky
*Attorney, Agent, or Firm*—Cushman, Darby & Cushman

[57] ABSTRACT

An industrial lift truck having a carriage movable up and down a mast, a turret with forks on the carriage. The carriage also carries two opposed racks and meshing gears engage one each of the racks to prevent undesirable swinging of the carriage.

7 Claims, 6 Drawing Figures

INDUSTRIAL LIFT TRUCKS

The invention relates to industrial lift trucks of the kind comprising a load lifting carriage movable up and down a mast structure mounted on the truck, a turret head mounted on the load lifting carriage for sideways movement relatively thereto, and a load supporting structure mounted on the turret head for rotation relatively thereto about an upright axis.

Such trucks are normally intended to work in narrow aisles between racks for the storage of goods. The truck is required to pass along an aisle and to move a load into or out of a rack on either side of the aisle. The rotation of the load supporting structure (for example, lifting forks) on the turret head turns it to face the rack to one side or the other of the aisle and then sideways movement of the turret head moves the load supporting structure into the rack and then out of the rack to stow or remove a load.

To permit free passage of the truck along an aisle it is necessary for there to be a clearance gap between each side of the load lifting carriage and the racking. However, in order to ensure that the load supporting structure can be inserted fully within the racking it is necessary for the turret head to project laterally from the load lifting carriage, across this gap, at the limits of its sideways movement. Also it is necessary for the turret head to be narrow in width to ensure the maximum possible space for the load between the turret head and the opposite racking when the turret head is at the limits of its sideways movement. The invention therefore provides a coupling system between the turret head and the load lifting carriage which can keep the turret head adequately supported and stable, in spite of its narrow width, as it projects laterally from the load lifting carriage.

According to the invention there is provided an industrial lift truck of the kind first referred to wherein there are mounted on the load lifting carriage, and extending across the width thereof, two spaced opposed toothed racks, and wherein there is provided on the turret head a gear assembly comprising two meshing gear wheels mounted on the turret head for rotation about parallel upright axes, one of the gear wheels meshing with one of the racks and the other gear wheel meshing with the other rack. Such an arrangement prevents swinging movement of the turret head on the load lifting carriage about an upright axis, even when part of the turret head projects laterally from the load lifting carriage where other guide means may be ineffective.

Preferably the gear assembly comprises a further gear wheel mounted on the turret head at a different level from the first mentioned gear wheels and also rotatable about an upright axis, which further gear wheel meshes with a further toothed rack extending across the width of the load lifting carriage. The provision of the further gear wheel at a different level improves the stability of the turret head on the load lifting carriage and restrains tilting of the turret head about horizontal axes.

Preferably the further gear wheel is coaxial with said one gear wheel. For example, they may be spaced vertically apart on a single vertical shaft carried on the turret head.

Preferably there is provided on the turret head a second gear assembly spaced laterally from the first said gear assembly and similar thereto. The provision of two similar gear assemblies permits one assembly to pass out of engagement with the toothed racks at each of the limits of sideways movement of the turret head and thus permits a greater extent of projection of the turret head laterally from the load lifting carriage.

Preferably a motor is drivably connected to at least one of the gear wheels of the assembly, or each assembly, whereby operation of the motor rotates the gear wheel and effects sideways movement of the turret head on the load lifting carriage. In the case where there are provided two similar gear assemblies the motor may be drivably connected to an intermediate gear wheel which meshes with one gear wheel of each assembly.

The following is a more detailed description of one embodiment of the invention reference being made to the accompanying drawings in which.

Figure 1:
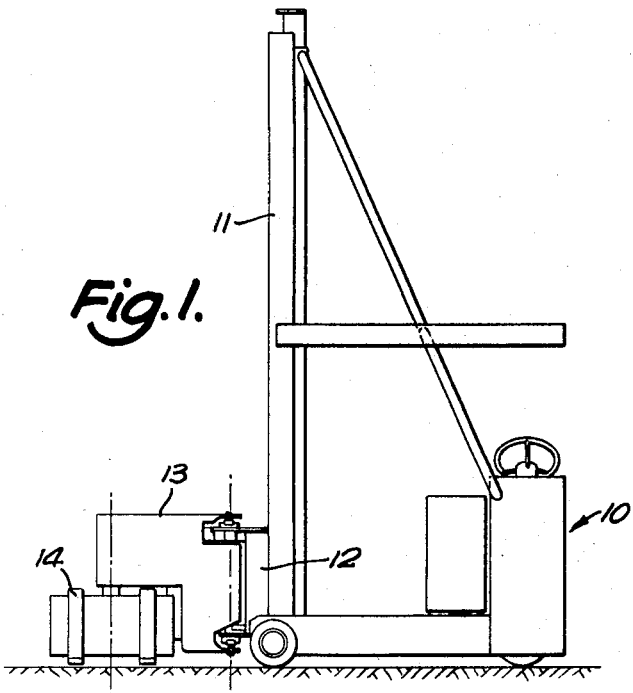
FIG. 1 is a diagrammatic side elevation of an industrial lift truck of the kind to which the invention is applied.
Figure 2:
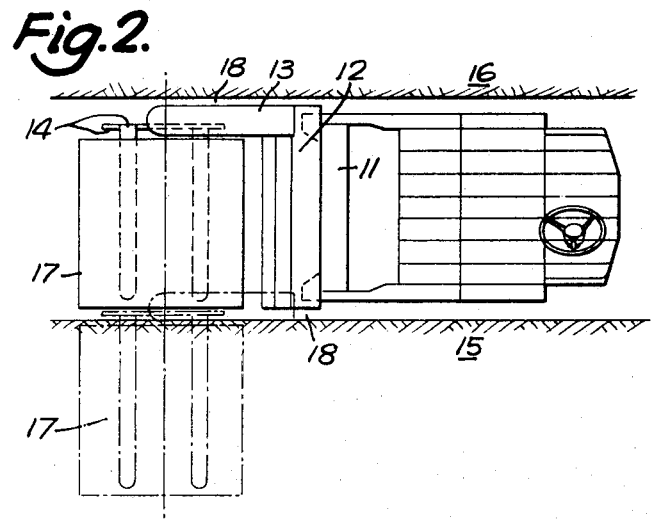
FIG. 2 is a plan view of the truck of FIG. 1 in use in conjunction with storage racking.

Referring to FIGS. 1 and 2 the industrial lift truck 10 has an upright mast structure 11 on which a load lifting carriage 12 is movable up and down. A turret head 13 is mounted on the load lifting carriage 12 for sideways movement relatively thereto and a load supporting structure in the form of lifting forks 14 is mounted on the turret head 13 for rotation about an upright axis.

Figure 3:
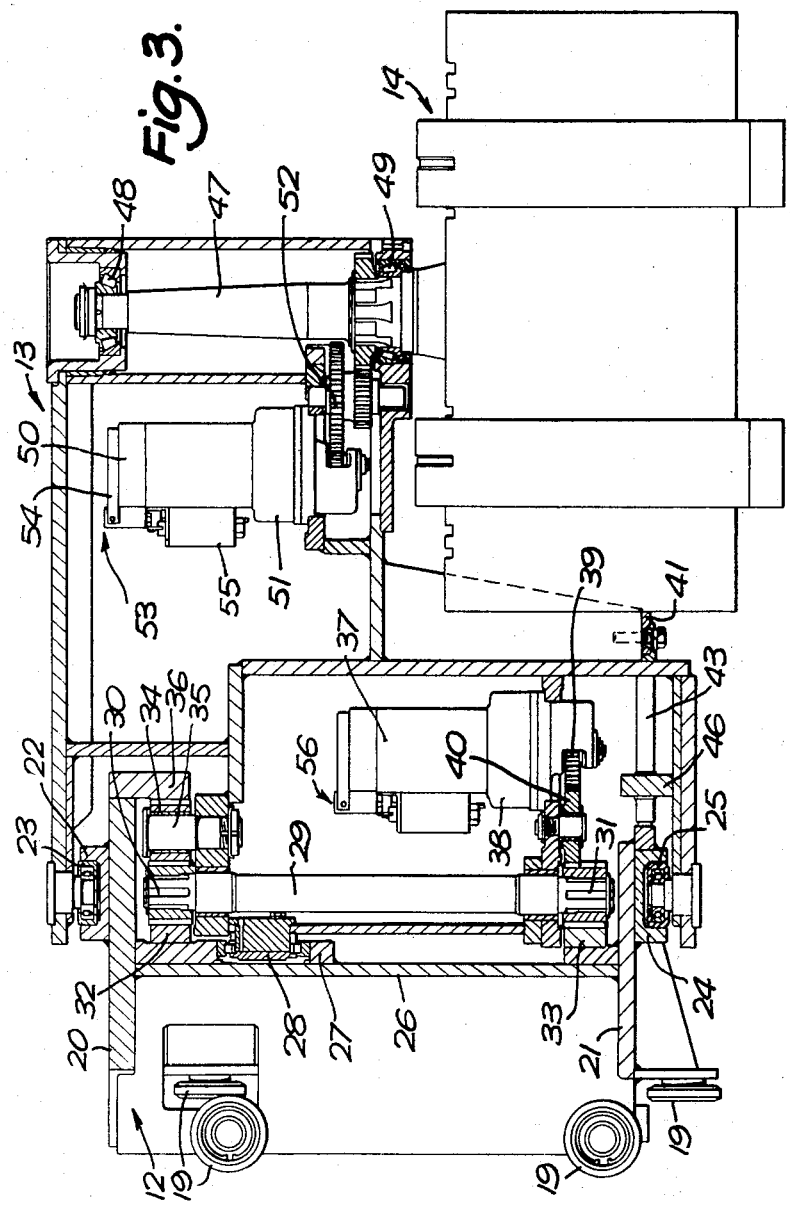
FIG. 3 is a vertical section through the load lifting carriage, turret head, and load supporting structure of the truck of FIGS. 1 and 2.
Figure 4:
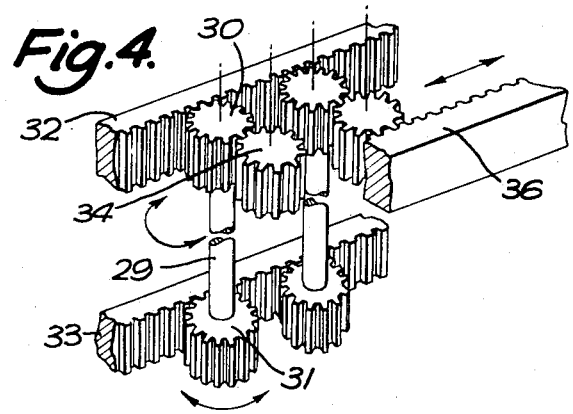
FIG. 4 is a diagrammatic perspective view showing the arrangement of the gear assemblies used in the arrangement of FIG. 3.

In FIG. 2 the truck is shown in a narrow aisle between two sets of racking 15 and 16. The truck 10 passes along the aisle and is required to move a load (indicated at 17) into or out of the racking to either side of the truck. As will be seen from FIG. 2 it is necessary for the turret head 13 to be narrow in width to ensure the maximum space for the load 17 between the turret head and the opposite racking when the lifting forks 14 are rotated to face sideways. Also to permit free passage of the truck along the aisle it is necessary for there to be a clearance gap (indicated at 18) between each side of the load lifting carriage 12 and the racking. However, in order to ensure that the lifting forks 14 and the load they carry can be inserted fully within the racking, it is necessary for the turret head to project laterally from the load lifting carriage 12 as shown in chain lines in FIG. 2. It will be seen that this leaves only a small portion of the turret head 13 still in engagement with the load lifting carriage 12 and FIGS. 3 and 4 show the coupling system between the turret head and the load lifting carriage which ensures that the turret head remains stable even when it is projecting laterally from the turret head. It will be appreciated that it is necessary for the turret head to project from the load lifting carriage at both opposite limits of sideways movement of the turret head since the forks 14 can be rotated through 180° from the position shown in FIG. 2 so as to be movable into and out of the racking 16.

Referring to FIGS. 3 and 4 the load lifting carriage 12 is provided with rollers 19 which engage the upright channels of the mast structure 11 so as to guide the load lifting carriage in its up and down movement on the mast structure. The load lifting carriage 12 has upper and lower plates 20 and 21 respectively which project forwardly of the mast structure and extend across the whole width of the carriage. The upper plate 20 has mounted on its upper surface an upwardly facing channel 22 which receives a roller 23 which is mounted for rotation about a vertical axis on the turret head 13. Similarly the underside of the plate 21 has mounted thereon a downwardly facing channel 24 which receives a roller 25 which is also mounted on the turret head.

A front plate 26 of the load lifting carriage 12 carries a forwardly projecting channel 27 which receives a roller 28 mounted on the turret head 13 to rotate about a fore and aft extending horizontal axis. The rollers 23, 25 and 28 therefore serve to support the turret head 13 on the load lifting carriage 12 and to permit free sliding movement of the turret head from side to side along the channels 22, 24 and 27 which extend across the full width of the turret head 12.

Mounted on the turret head 13 are two similar gear assemblies which serve to stabilise the turret head during its movement on the load lifting carriage 12. Each gear assembly comprises a vertical shaft 29 which is rotatable in spaced bearings on the turret head 13 and carries on its upper end a pinion 30 and on its lower end a pinion 31. The pinions 30 and 31 are in mesh with horizontal toothed racks 32 and 33 respectively which are mounted on the front plate 26 of the load lifting carriage and which extend across the whole width of the carriage. The upper pinion 30 is in mesh with another pinion 34 which is carried on a stub shaft 35 rotatable in bearings on the turret head 13. The pinion 34 is in mesh with a further horizontal toothed rack 36 which is opposite to the toothed rack 32 and also extends across the full width of the load lifting carriage 12.

As will be best seen from FIG. 4 the interengagement between the pinions 30 and 34 and between them and the racks 32 and 36 respectively will prevent pivoting movement of the turret head 13, on which the pinions are mounted, relatively to the load lifting carriage 12 about an upright axis. The provision of the further pinion 31 spaced well below the pinion 30 will prevent rocking of the turret head 13 from side to side or backwards and forwards about horizontal axes.

As mentioned above, and as shown in FIG. 4, each gear assembly comprising the shaft 29, pinions 30, 31 and 34, is duplicated, the two gear assemblies being disposed side by side, so that as the turret head reaches one limit of its sideways movement on the load lifting carriage, one of the gear assemblies can come out of engagement with the racks 32, 33 and 36, so that the turret head can project laterally from the load lifting carriage as shown in chain lines in FIG. 2. In this case however the other gear assembly remains in contact with the racks and maintains the turret head in a stable condition.

The gear assemblies are also used for transmitting a drive to the turret head to move it sideways on the load lifting carriage. An electric motor 37 is mounted vertically on the turret head 13 and is coupled, through a gyral gear box 38 to a gear wheel 39. The gear wheel 39 is in mesh with an idler gear 40 which is in turn in mesh with both of the lower pinions 31 of the two gear assemblies. Actuation of the motor 37 thus rotates the two pinions 31 in the same direction and thus rotates the shafts 29 to propel the turret head sideways due to engagement of the pinions 30 and 31 with the racks 32 and 33 respectively.

As mentioned earlier it is necessary for the turret head 13 to project from the load lifting carriage 12 when it reaches the limit of its sideways movement in the direction in which the lifting forks 14 are facing. This should occur in both directions of movement. However it is important that the turret head should not project from the load lifting carriage 12 when it reaches the limit of its movement in a direction away from the direction in which the lifting forks 14 are facing. This is the position shown in full line in FIG. 2. The reason for this is that it may be necessary for the truck to travel along the aisle with the lifting forks still facing sideways as shown in FIG. 2 and if the turret head is permitted to project laterally beyond the load lifting carriage at that limit of its movement it could foul the racking 16. It is therefore necessary to adjust the two limiting positions of the turret head 13 depending on the direction in which the lifting forks 14 are facing. A mechanism for achieving this is shown in FIGS. 5 and 6.

Figure 5:
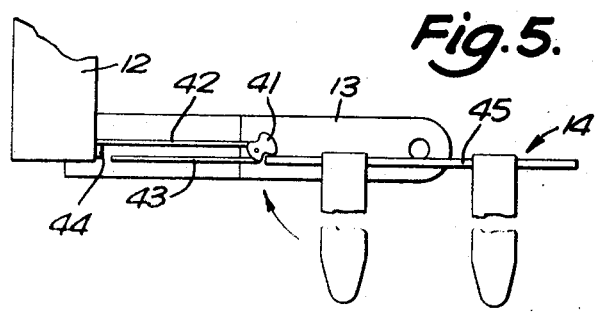
FIGS. 5 and 6 are diagrammatic plan views of the turret head, load supporting structure and part of the load lifting carriage showing the two alternative positions of the stop device.
Figure 6:
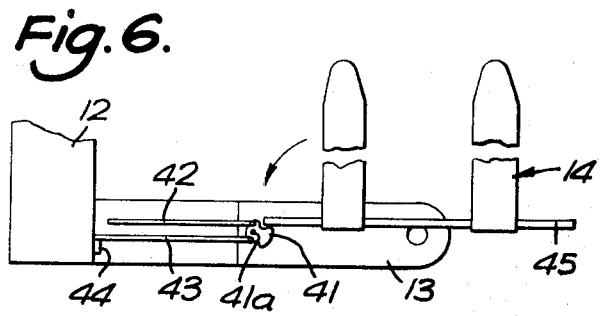

Referring to FIGS. 5 and 6: there is mounted on the turret head 13 a bell crank lever 41 mounted for pivoting movement about a vertical axis indicated at 41a. Two elongated stop rods 42 and 43 are mounted on the turret head 13 for reciprocal movement. The stop rods are pivotally connected to the bell crank lever 41 on opposite sides of its axis of pivoting. The lengths of the rods 42 and 43 are such that when the bell crank lever 41 is pivoted anti-clockwise (as shown in FIG. 5) the end of the rod 42 projects into a position where it is engageable with a fixed abutment 44 on the load lifting carriage 12 whereas when the lever 41 is pivoted clockwise (as shown in FIG. 6) the rod 43 is moved to a position where it is engageable with the abutment 44. The relative dispositions of the abutment 44 and the rods 42 and 43 are such that when the rod 43 engages the abutment the edge of the turret head 13 is flush with the edge of the load lifting carriage 12 (as shown in FIG. 6) whereas when the rod 42 is in engagement with the abutment 44 the turret head 13 can move further sideways to a position where it projects laterally from the load lifting carriage 12.

The load supporting structure 14 comprises a vertical back plate 45 on which the lifting forks are supported and the bell crank lever 41 is so disposed that it is engaged by an edge of the plate 45 and pivoted clockwise or anti-clockwise depending on the direction in which the forks are turned. It will thus be seen from FIGS. 5 and 6 that the stop arrangement permits the turret head 13 to project laterally beyond the load lifting carriage 12 when the turret head is moving sideways in the same direction as the forks are facing. As mentioned above this permits the forks to be inserted fully into the racking. It will be appreciated that an abutment similar to the abutment 44 is also disposed at the opposite side of the load lifting carriage. Preferably the lengths of the rods 42 and 43 are such that they cannot, at the same time, both be in a position where they will not engage the abutments 44. Thus should the load lifting structure 14 be in an intermediate position so that the bell crank lever 41 is free to pivot it is then impossible for the bell crank lever to pivot to a position where both stop rods 42 and 43 are free of engagement with the abutment 44 and would thus permit the turret head 13 to move sideways out of engagement with the load lifting carriage 12.

Part of the bell crank lever 41 and one of the stop rods 43 is shown in FIG. 3 and it will be seen that the stop rods are reciprocable in bearing blocks 46 mounted on the turret head.

Referring again to FIG. 3 it will be seen that the load supporting structure 14 is carried on the lower end of a vertical shaft 47 mounted in bearings 48 and 49 on the turret head. The load supporting structure is rotated by an electric motor 50 mounted on the turret head which motor drives the shaft 47 through a gyral gear 51 and gear train 52. The gear train is reversible and thus rotation of the load supporting structure 14 by an external force, for example as a result of striking an obstruction, could permit the structure to rotate. It is desirable to provide some restraint against this and for this purpose there is associated with the electric motor 50 a friction brake assembly indicated generally at 53.

The brake assembly comprises callipers 54 which are engageable with a brake drum mounted on the end of the motor shaft, and the callipers 54 are operated by an electric solenoid 55. The callipers are spring biassed so as normally to engage the brake drum and energisation of the solenoid 55 releases the brake. The electric switch controlling the supply of power to the motor 50 is coupled to the switch controlling the solenoid 55 so that when the switch is operated to energise the motor to rotate the load supporting structure the solenoid 55 is simultaneously energised to release the brake. When the motor 50 is stopped the brake re-engages. In this condition the brake also serves as an overload device since it will yield and permit rotation of the motor gear assembly and load lifting structure should sufficient external force be applied to the structure.

A similar brake assembly indicated generally at 56 is associated with the aforementioned motor 37 which effects side shifting movement of the turret head on the load lifting carriage. This again serves as a safety overload device.

The use of electric motors for shifting the turret head sideways and rotating the load lifting structure means that the operation of the whole assembly can readily be made wholly or partly automatic in operation. For example it may be required to rotate a load while the truck is in an aisle between two sets of racking. It will be appreciated that to achieve this it is necessary to effect simultaneous sideways movement of the turret head 13 and rotation of the load supporting structure 14 and to this end there may readily be provided a control system controlling the motors 37 and 40 so that they operate in coordination to match the speed of sideways movement of the turret head 13 with the speed of rotation of the structure 14.

We claim:

1. An industrial lift truck comprising a mast structure mounted on the truck:
   a load lifting carriage which is movable up and down the mast structure;
   a turret head mounted on said load lifting carriage for sideways movement relatively thereto;
   a load supporting structure mounted on said turret head for rotation relatively thereto about an upright axis;
   two spaced apart horizontally opposed toothed racks which are fixedly mounted on one end of said load lifting carriage and extend across the width thereof;

a gear assembly mounted on said turret head and including two gear wheels in mesh with each other which are mounted on said turret head for rotation about parallel upright axes, one of the gear wheels being in mesh with one of said two racks and the other gear wheel being in mesh with the other of said two racks; and
   means for driving said one gear wheel so as to move said turret head sideways.

2. An industrial lift truck according to claim 1, wherein the gear assembly comprises a further gear wheel mounted on the turret head at a different level from the first mentioned gear wheels and also rotatable about an upright axis, which further gear wheel meshes with a further toothed rack extending across the width of the load lifting carriage.

3. An industrial lift truck according to claim 2, wherein the further gear wheel is coaxial with said one gear wheel.

4. An industrial lift truck according to claim 3, wherein the said one gear wheel and the said further gear wheel are vertically spaced apart on a single vertical shaft carried on the turret head.

5. An industrial lift truck according to claim 4, wherein there is provided on the turret head a second gear assembly similar to and spaced laterally from the first-mentioned gear assembly, the second gear assembly being in engagement with said two racks, and arranged to move out of engagement with said two racks when said turret head approaches one end of a sideways movement.

6. An industrial lift truck according to claim 5, wherein said means for driving comprises a motor which is drivably connected to rotate at least one of the gear wheels of each gear assembly.

7. An industrial lift truck according to claim 6, wherein the motor is drivably connected to an intermediate gear wheel which meshes with one gear wheel of each gear assembly.

* * * * *